(12) United States Patent
Tao et al.

(10) Patent No.: US 6,696,803 B2
(45) Date of Patent: Feb. 24, 2004

(54) SELF-OSCILLATING ELECTRONIC DISCHARGE LAMP BALLAST WITH DIMMING CONTROL

(75) Inventors: Fengfeng Tao, Blacksburg, VA (US); Fred C. Lee, Blacksburg, VA (US)

(73) Assignee: Virginia Tech Intellectual Properties, Inc., Balcksburg, VA (US)

(*) Notice: Subject to any disclaimer, the term of this patent is extended or adjusted under 35 U.S.C. 154(b) by 0 days.

(21) Appl. No.: 10/014,800

(22) Filed: Dec. 14, 2001

(65) Prior Publication Data

US 2002/0113556 A1 Aug. 22, 2002

Related U.S. Application Data

(60) Provisional application No. 60/255,072, filed on Dec. 14, 2000.

(51) Int. Cl.[7] .............................. G05F 1/00; H05B 37/02
(52) U.S. Cl. ....................... 315/291; 315/307; 315/224
(58) Field of Search ......................... 315/307, 291, 315/209 R, 308, 219, 224, 247, 362, 244, 360, DIG. 4, DIG. 5, DIG. 7

(56) References Cited

U.S. PATENT DOCUMENTS

| | | | | | |
|---|---|---|---|---|---|
| 4,346,332 A | * | 8/1982 | Walden | ........................ | 315/307 |
| 4,698,554 A | * | 10/1987 | Stupp et al. | .................. | 315/307 |
| 5,173,643 A | * | 12/1992 | Sullivan et al. | .............. | 315/276 |
| 5,220,247 A | * | 6/1993 | Moisin | ..................... | 315/209 R |
| 5,539,281 A | * | 7/1996 | Shackle et al. | .............. | 315/224 |
| 5,623,187 A | * | 4/1997 | Caldeira et al. | ............. | 315/307 |
| 6,016,257 A | * | 1/2000 | Chang et al. | ................... | 363/17 |
| 6,020,688 A | * | 2/2000 | Moisin | ..................... | 315/209 R |
| 6,137,240 A | * | 10/2000 | Bogdan | ....................... | 315/307 |
| 6,236,168 B1 | * | 5/2001 | Moisin | ......................... | 315/291 |
| 6,262,542 B1 | * | 7/2001 | Kim et al. | .................... | 315/224 |
| 6,304,041 B1 | * | 10/2001 | Farkas et al. | ................ | 315/291 |
| 2002/0113556 A1 | * | 8/2002 | Tao et al. | .................... | 315/219 |

* cited by examiner

Primary Examiner—Don Wong
Assistant Examiner—Chuc Tran
(74) Attorney, Agent, or Firm—Whitham, Curtis & Christofferson, P.C.

(57) ABSTRACT

A simplified electronic ballast for a discharge lamp which provides dimming by control of inverter frequency through modulation of magnetizing current in a transformer such that the switching frequency is made substantially independent of the load presented. The principle of frequency control in a manner independent of the load is extendable to other types of loads and power supplies and converters to regulate power coupled to the load. Clamping capacitors are used to replace other clamping circuits in order to allow current injection to be controlled by a simple variable voltage while frequency control by current injection provides enhanced circuit performance.

17 Claims, 6 Drawing Sheets

ONE IMPLEMENTATION OF VOLTAGE-CONTROLLED VOLTAGE SOURCE REQUIRED

SELF-OSCILLATING ELECTRONIC DISCHARGE LAMP BALLAST WITH DIMMING CONTROL

This application claims the benefit of provisional application 60/255,072 filed on Dec. 14, 2000.

BACKGROUND OF THE INVENTION

1. Field of the Invention

The present invention generally relates to self-oscillating power supplies with adjustable power control and, more particularly, to electronic, self-oscillating discharge lamp ballast with lamp dimming control.

2. Description of the Prior Art

The increased efficiency of gas-discharge lamps, such as well-known fluorescent tubes, over incandescent light sources has long been appreciated. Such gas-discharge light sources generally produce far less heat and thus have a much higher efficiency of energy conversion to light. Overall efficiency of such lamps in a given application may also be increased by the fact that removal of heat is generally unnecessary. However, some problems have been presented in the past in regard to light spectral content and the ability to control the amount of light output from a given gas-discharge lamp which are not presented by incandescent light sources.

Nevertheless, the efficiency gains to be realized over incandescent sources has led to significant advances in both of these areas and, in many cases, gas-discharge and fluorescent lamps have been fabricated and marketed as direct replacements for incandescent lamps. However, the electrical characteristics of gas-discharge lamps are much more complicated than those of incandescent lamps (the latter being essentially a slightly variable resistor) and known arrangements for controlling light output of gas-discharge lamps have been correspondingly complex and expensive.

More specifically, only slight brightness control is available from traditional magnetic ballasts for gas-discharge lamps and electronic ballasts are generally preferred at the present time to provide a wider range of brightness control as well as the advantages of small size, light weight, high luminous efficiency, long life and the absence of light flicker or audible noise. The capability of dimming or brightness control is currently considered crucial in energy-saving lighting systems which studies have shown can provide in excess of fifty percent energy savings. In commercial environments dimming control systems can increase productivity by allowing employees to have personal control over workspace lighting, for example, to reduce glare at computer workstations. Dimming systems can also provide flexibility and achieve aesthetic effects for different activities and add versatility to architectural spaces, such as by visual partitioning, and visually enhancing objects and features of the spaces.

Unfortunately, as alluded to above, electronic ballast providing for dimming control is expensive and complex. Self-oscillating drive is usually employed to reduce control complexity and cost as much as possible. However, the operation of known self-oscillating circuits is, by their nature, load dependent and thus difficult to control and very sensitive to variations of the load, components of the circuit and line input voltage. This is because variations in the load, components of the circuit and/or line voltage alter the self-oscillation frequency and thus change lamp power, often by a larger factor than the variation from nominal parameter values. For example, the lamp power may vary ±15% for a ±10% variation in line voltage. Such a variation substantially exceeds the ±10% lamp power limit and may shorten lamp lifetime. These problems are not limited to control of gas-discharge lamps but are common to self-oscillating arrangements in power supplies and converters, generally, including those of buck, boost, buck-boost, flyback types as well as forward converters, push-pull converters, symmetrical or asymmetrical half-bridge converters and full bridge converters.

Another complication is that of lamp current crest factor (CF) which is the ratio of of the peak of the lamp current to the rms value. For high frequency ballast, the CF is the peak of the modulated envelope to the rms value and plays a significant role in ballast design. Generally, the higher the CF, the shorter the lifetime of a fluorescent lamp. A pure sine wave without modulation has a crest factor of 1.4 and a triangular wave has a crest factor of 1.7. ANSI specifications recommend a maximum CF of 1.7. Since some electronic ballasts such as charge-pump power-factor-correction (CPPFC) electronic ballasts use modulated resonant components to achieve power factor correction, the lamp current CF is usually larger than 1.7. Therefore, frequency modulation is usually employed to improve CF even though it is subject to the difficulties discussed above.

SUMMARY OF THE INVENTION

It is therefore an object of the present invention to provide a simplified and relatively inexpensive electronic power supply/converter and/or ballast for gas-discharge lamps which provides easily controlled adjustability of power regulation with high efficiency and good lamp current crest factor.

It is another object of the invention to provide an effective technique and circuit for achieving frequency modulation for improving the crest factor of circuits using resonant components for power factor correction such as charge-pump power factor correction electronic ballasts and the like.

In order to accomplish these and other objects of the invention, a power supply such as a ballast for a gas discharge lamp is provided comprising an inverter circuit, a resonant matching circuit, and a converter circuit for determining switching frequency of the inverter circuit substantially independent of a load, whereby power coupled to a load through the resonant circuit is controlled.

In accordance with another aspect of the invention, a method of controlling high frequency electrical power delivered to a load from a self-oscillating power supply is provided including steps of controlling magnetizing current in a transformer of an inverter circuit to control switching frequency of the inverter circuit, and coupling an output of said inverter circuit to a load through a resonant circuit.

BRIEF DESCRIPTION OF THE DRAWINGS

The foregoing and other objects, aspects and advantages will be better understood from the following detailed description of a preferred embodiment of the invention with reference to the drawings, in which.

DETAILED DESCRIPTION OF A PREFERRED EMBODIMENT OF THE INVENTION

Figure 1:
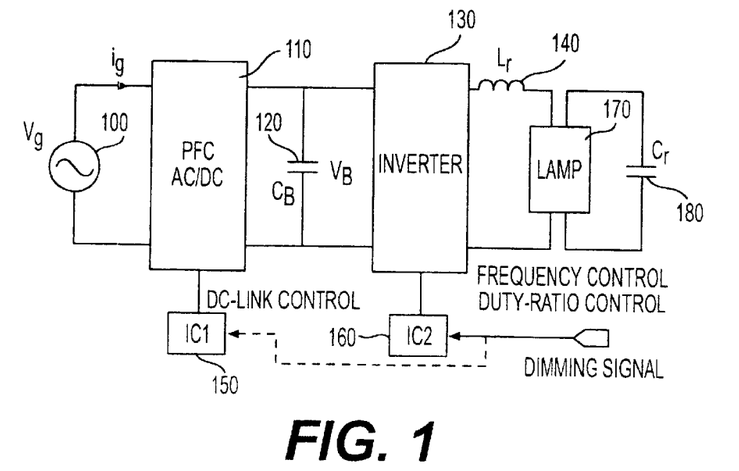
FIG. 1 is a schematic diagram of an electronic ballast dimming system.

Referring now to the drawings, and more particularly to FIG. 1, there is schematically shown a generalized electronic ballast including a dimming system including functional blocks common to such arrangements known in the art and currently available. Since this depiction is generalized and arranged to facilitate an understanding of the invention, no portion of FIG. 1 (or any other Figure) is admitted to be prior art as to the present invention.

As shown in FIG. 1, it will often be desirable for the electronic ballast to be powered from an alternating utility line as depicted by alternating voltage source 100. However, the electronic ballast or power supply circuit is preferably powered by direct current. In such a case, it will also often be necessary (e.g. to comply with IEC-61000-3-2 class C regulations) to include power factor correction and AC/DC conversion 110. It is to be understood that such arrangements are generally well-understood in the art and, while omitted from some of the remaining Figures in the interest of clarity, may be included with the invention or not as the application of the invention or other circumstances may require. A DC link capacitor 120 is preferably provided in any case.

Since the lamp must be powered by alternating current an inverter stage 130 is provided and a series-connected inductance 140 is generally used to convert the substantially square wave output of inverter 130 to a near-sinusoid wave form. This inductor 140 should also be understood to represent an LC or LCC resonant matching network (including the inherent capacitance 180 of the lamp 170) which assists in wave shaping to extend discharge lamp life while minimzing electromagnetic interference (EMI).

In such an arrangement, basically three parameters may be controllably varied to control lamp power: the DC link voltage, VB, the duty ratio, D, and the switching frequency, fs. DC link voltage control refers to changing the magnitude of the DC link voltage VB while maintaining the frequency and duty ratio constant and dimming is naturally accomplished thereby since lamp current and, hence, lamp power is a function of the DC link voltage. Duty ratio control refers to changing the on-time of the switches of the inverter while keeping the length of the switching period constant. Dimming is accomplished by adjustment of duty ratio because less energy is transferred from the source to the load when the on-time is reduced. Frequency control refers to changing the switching frequency while maintaining the duty ratio constant (e.g. 50%). Dimming is accomplished through frequency control by moving the switching frequency away from the natural resonance of the resonant circuit 140 so that less energy is coupled to the lamp. Several of these types of control can be used in combination but arrangements for doing so are generally of increased complexity.

DC link voltage dimming control is seldom employed since there is no cost-effective way to control the output voltage of the power factor correction (PFC) stage to control the DC link voltage. Duty ratio control is a good dimming practice but special care must be taken since the switch with a small duty ratio will lose its zero-voltage switching operation and suffer from severe reverse-recovery-related problems of the body diode of MOSFETs.

Self-oscillating converters have been known for about forty-five years and have found many applications in DC-to-DC converters, and electronic ballast. The major advantages of a self-oscillating converter are circuit simplicity and robust operation, particularly in ballast applications where it is regarded as one of the simplest and most cost-effective topologies. However, as alluded to above, the operating frequency of a self-oscillating resonant circuit is, by the nature of its operation, load dependent and difficult to control, particularly consistent with the use of simple circuits. Hence, luminous efficiency of the driven lamp may not be optimized for a given combination of circuit components and dimming by frequency control is complicated in conventional self-oscillating ballasts. To overcome these problems, the power control scheme in accordance with the invention utilizes magnetizing current modulation, as will be discussed below, to effectively change the switching frequency so that lamp power is much more easily regulated to achieve, for example, dimming control in a gas-discharge ballast application without complicated circuitry.

Figure 2:
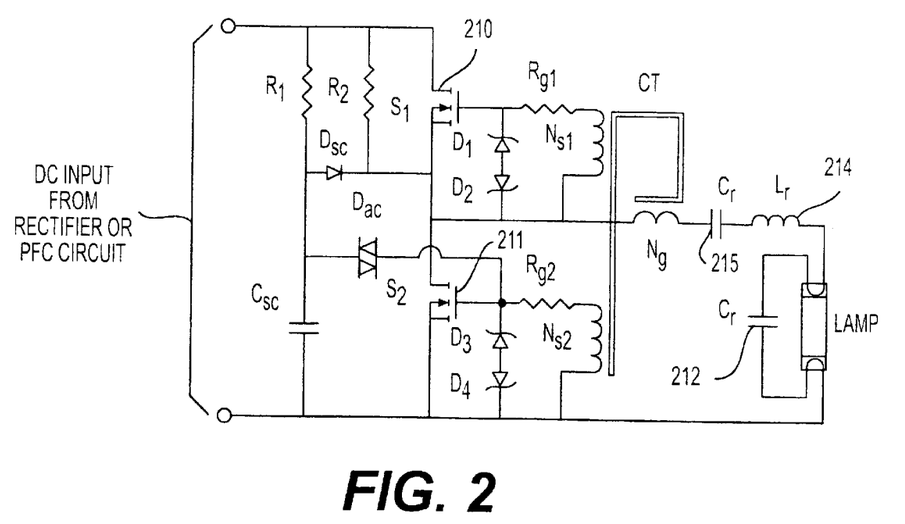
FIG. 2 is an exemplary MOSFET-based self-oscillating electronic ballast circuit in accordance with the invention.

The principle of self-oscillation will now be discussed in connection with FIGS. 2, 3A and 3B. FIG. 2 shows an exemplary MOSFET-based self-oscillating electronic ballast. Two MOSFETs 210, 211 form a half-bridge inverter stage to output a square voltage wave. The high frequency capacitor Cr (212) and inductance Lr (214) form a resonant matching network to shape the inverter output voltage waveform, provide a proper starting voltage and stabilize the lamp current during steady-state operation. The capacitor Cd 215 functions as a blocking capacitor to block DC voltage across the inductor 214. The self-oscillating drive circuitry includes a current transformer (CT) with three windings (Np, Ns1 and Ns2), gate resistors Rg1 and Rg2 and two sets of back-to-back zener diodes D1–D4. The resonant inductor current is fed back through the current transformer CT and converted into a complementary voltage to drive the MOSFETs 210, 211. An initial gate pulse is provided by starter circuit comprising resistors R1, R2, capacitor Cst, diode Dst and diac Dac.

Figure 3A:
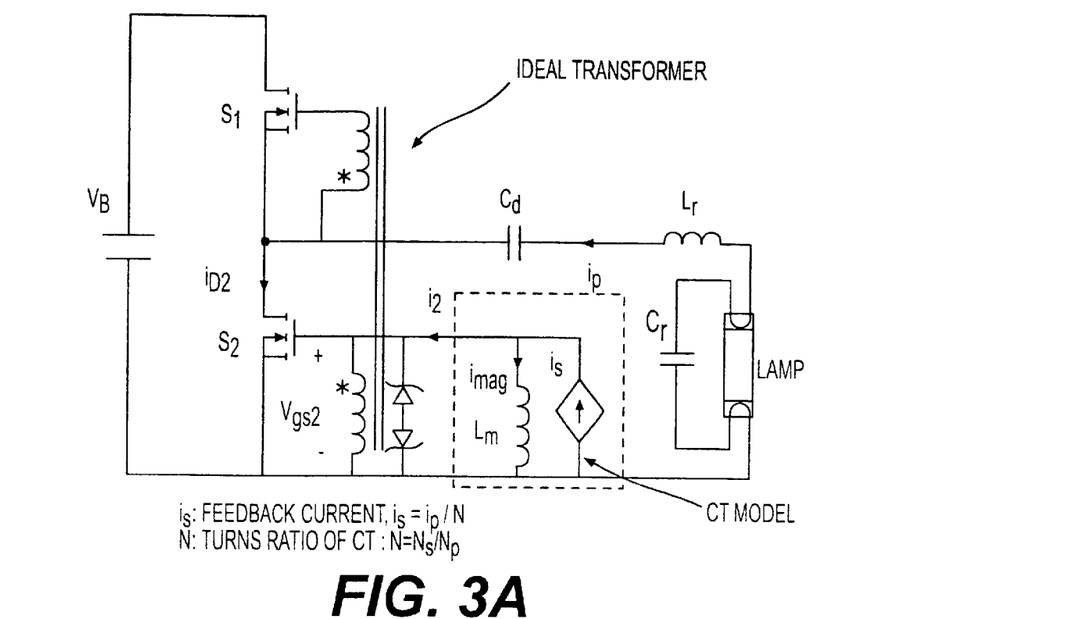
FIGS. 3A and 3B is an illustration of a simplified equivalent circuit of the circuit of FIG. 2 and waveforms present therein.
Figure 3B:
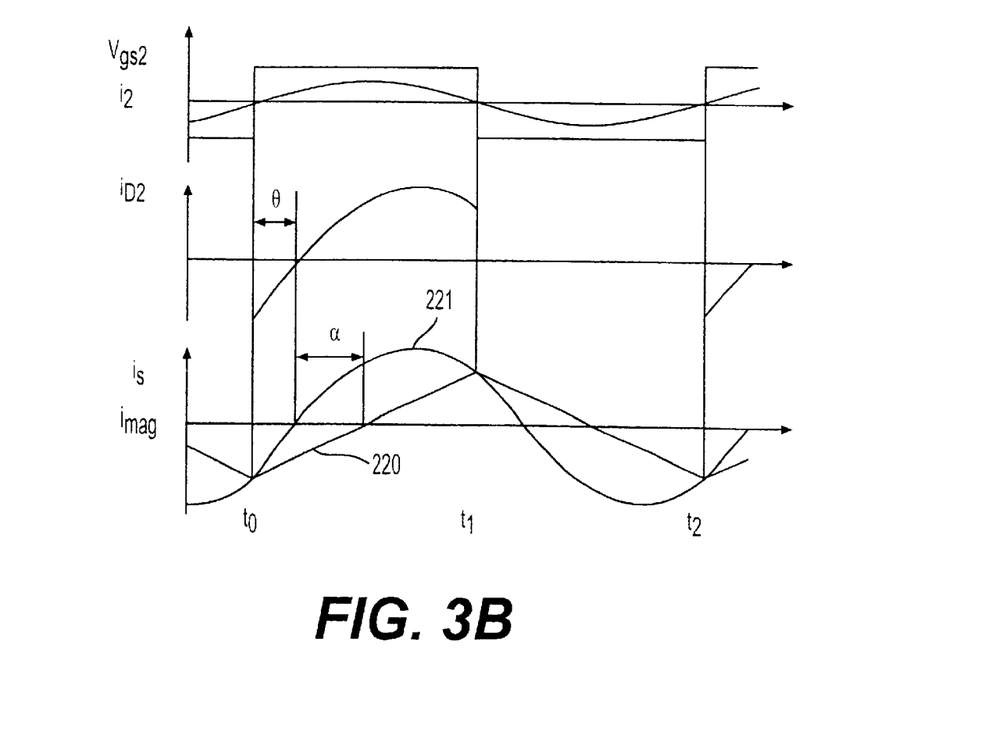

A simplified equivalent circuit of the circuit of FIG. 2 is shown in FIG. 3A. The assumptions made in the equivalent circuit of FIG. 3A will allow a simplified explanation and analysis of the operation of a self-oscillating electronic ballast. The current transformer is modeled as a current-control current source shunted by a magnetizing inductance Lm. An ideal transformer couples the two gates of the MOSFETs. It is assumed that at an arbitrary reference time, t0, (FIG. 3B) that S1 is off and S2 is on. Thus the magnetizing current Imag is lower than the feedback current If so that the zener diode current Iz is positive. For ideal zeners, the voltage applied to the S2 gate is positive while the voltage applied to the S1 gate is negative; maintaining the on-state of S2 and off-state of S1. Due to the positive winding current, the magnetizing current increases linearly while the feedback current changes in a resonant manner as shown in FIG. 3B at 220 and 221, respectively. Eventually, at time t1, the magnetizing current exceeds the feedback current and the zener current Iz changes sign, allowing the zener voltage to change sign and resulting in the turn-off of S2 and the turn-on of S1 to start the next symmetrical half-cycle.

It can also be seen from the mode of operation described above that the relative magnitude of the feedback current and the magnetizing current play a key role in determining the operating frequency. Let $\alpha$ be the phase angle between the feedback current and the magnitizing current, and $\theta$ be the phase angle between the inverter output and the induced resonant current, as shown in FIG. 3B. Thus $$\alpha=(\Pi/2)-\theta; \qquad (1)$$

$$I_p \sin \theta/N = \text{Imag}@t0 = VzTs/4Lm \qquad (2)$$

where $I_p$, N and Vz are peak values of the resonant current, turns ratio of the current transformer CT and the zener voltage including the voltage drop of the back-to-back diode, respectively. Qualitatively, this means that as the winding voltage is increased, the slope of the magnetizing current will increase and, since the magnetizing current and the zener current are complementary, the switching period (when the magnetizing current exceeds the zener current) will become shorter and switching frequency will increase. This is the dominant effect on switching frequency and is subject to variations in load, DC link voltage and component variations in the absence of control of the winding voltage provided in accordance with the invention.

Now, considering the inductance formula $$Lm=\mu AeN_p^2/le \qquad (3)$$

where $\mu$, Ae and le are core material permeability, effective cross-sectional area and effective magnetic path length, respectively, $$N_p=(leVzTsNs/(\mu Ae)\ (4le \sin \theta))^{1/3}. \qquad (4)$$

Figure 4:
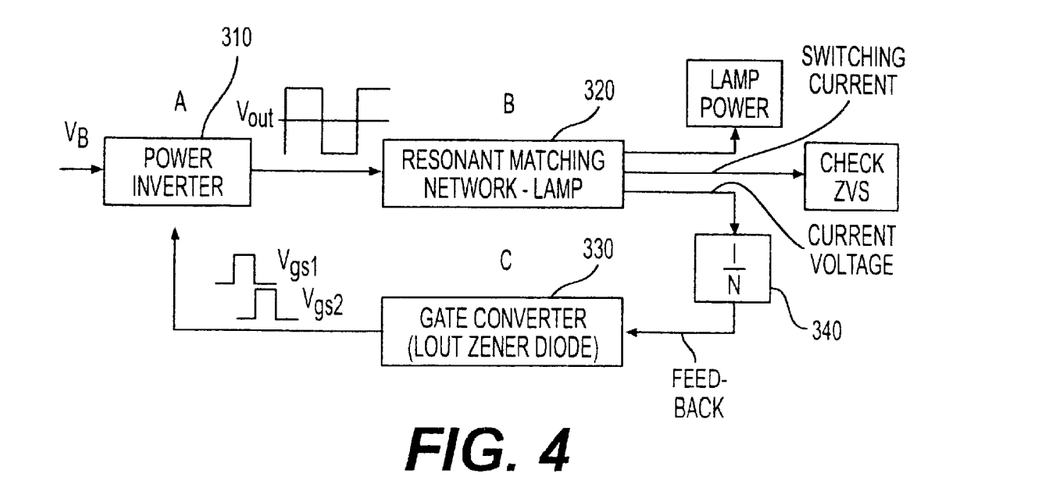
FIG. 4 is generalized schematic diagram of the electronic ballast in accordance with the invention.

Therefore, the design procedure for this simplified circuit is straight-forward. Conventional design procedures are used to design the resonant components Lr and Cr for a given bus voltage and switching frequency. Then $I_p$ and $\theta$ are determined at rated lamp power. From this and a selection of a core and operating flux density, Bop, the secondary winding turns of the current transformer are given by $$Ns=VxTs/2AeBop \qquad (5)$$

and primary winding turns are calculated based on equation (4). While the above analysis and design guideline are based on a simplified model, a more detailed analysis can be found in "A Self-Oscillating Drive for Single-Stage Charge-Pump Power-Factor-Correction Electronic Ballast with Frequency Modulation" by Tao et al., Industry Applications Conference, 2000; Conference Record of the IEEE, Volume 5, 2000; pp.3367–3373 which is hereby fully incorporated by reference. However, from this simplified model, the self-oscillating resonant circuit can be considered as a system which is comprised of three sub-systems as illustrated in FIG. 4: a power inverter 310 providing a square voltage wave, a matching network 320 shaping the square wave into a sinusoidal wave, and a gate converter 330 converting the feedback current or voltage measured by voltage or current sensor 340 into suitable gate drive voltages to drive the switching transistors of the inverter. These three subsystems form a stable, self-contained loop as long as stability criteria are met, as will be evident to those skilled in the art. The frequency is essentially self-determined for a given set of circuit parameters and is thus substantially dependent on changes in the load.

To obtain control of frequency for dimming control, it is necessary to introduce some control voltages into the self-contained closed loop. A preferred method of doing so is by current injection noted and explained in the above-incorporated Tao et al. article. As alluded to above, the switching frequency increases as the injected winding current increases and decreases as injected current decreases. This technique has been successfully used and dramatically improves circuit performance in terms of power factor, line current harmonics, lamp current crest factor and sensitivity of lamp power to line variations. The only significant drawback is the derivation of a suitable current to inject into the current transformer.

Figure 5:
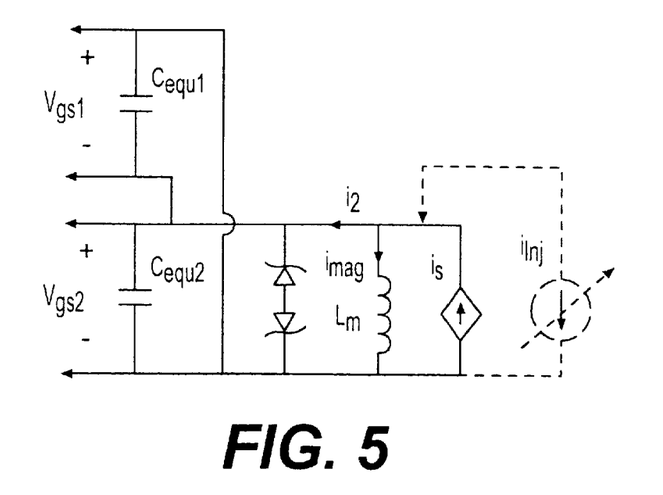
FIG. 5 is simplified circuit of the gate converter of FIG. 4.

To overcome this problem a universal technique for alteration of self-oscillating frequency will now be discussed. FIG. 5 shows a simplified gate converter if gate isolation is not considered. As discussed above, the polarity of the zener current, Iz, determines the polarity of the gate drive voltages. Thus, changing the polarity of Iz can change the switching frequency. The zener current is the difference between the feedback current and the magnetizing current, and given by $$Iz=Is-\text{Imag}=(I_P/N)-\text{Imag}. \qquad (6)$$

This shows that suitable feedback current can assure good performance. As shown by the dashed line of FIG. 5, a third controllable current, Iinj, to modify the zero-crossing moment of Iz can be injected. Thus Iz can be controlled by controlling the magnetizing current. However, the range over which the switching frequency can be modified is limited.

Changing the voltage applied to the current transformer winding is an effective way to control the magnetizing current change, assumin that the transformer winding voltage can be controlled. Fortunately, the winding voltage of the current transformer is determined by the secondary circuitry.

Figure 6A:
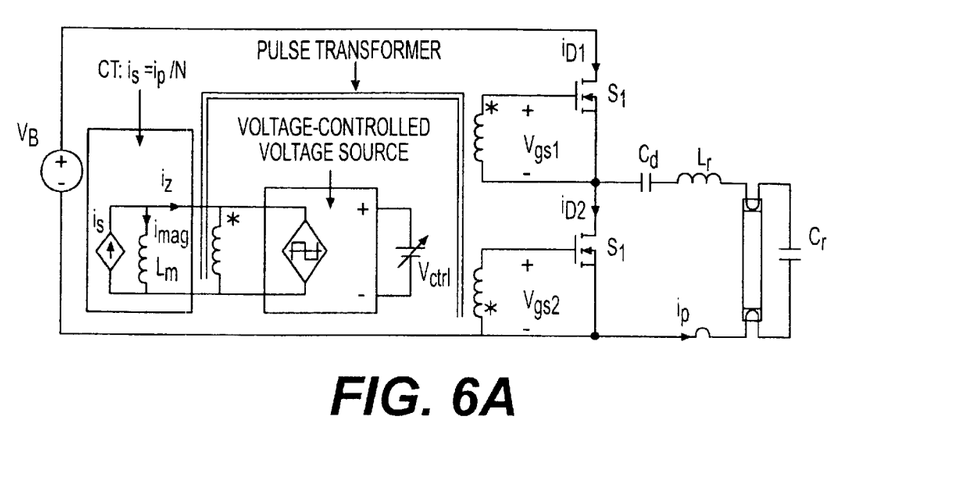
FIG. 6A is an equivalent circuit of a variable current transformer (CT) winding voltage.
Figure 6B:
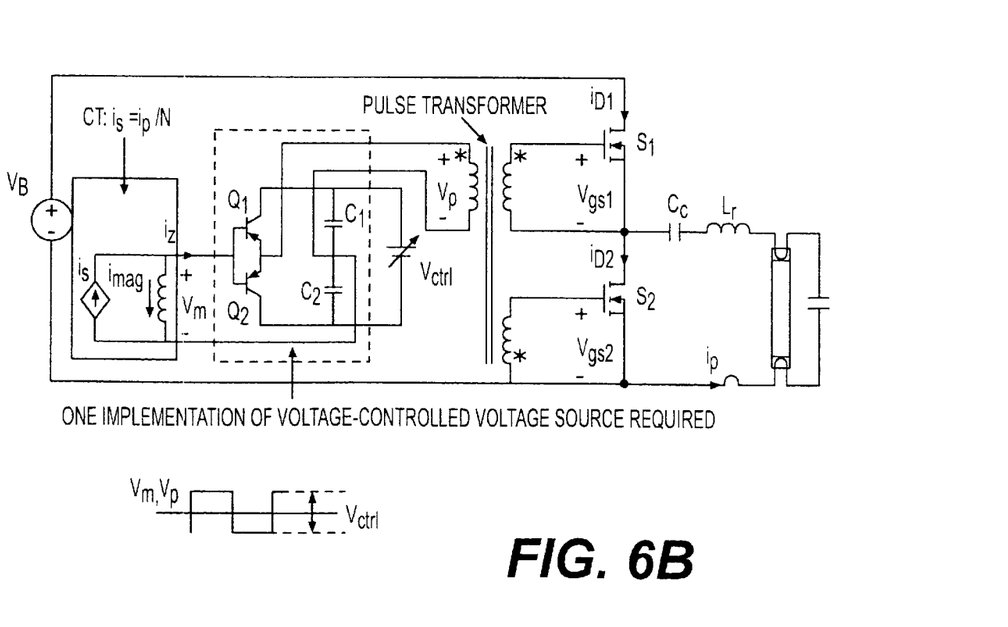
FIG. 6B is an exeplary practical implementation of the circuit of FIG. 6A.
Figure 7:
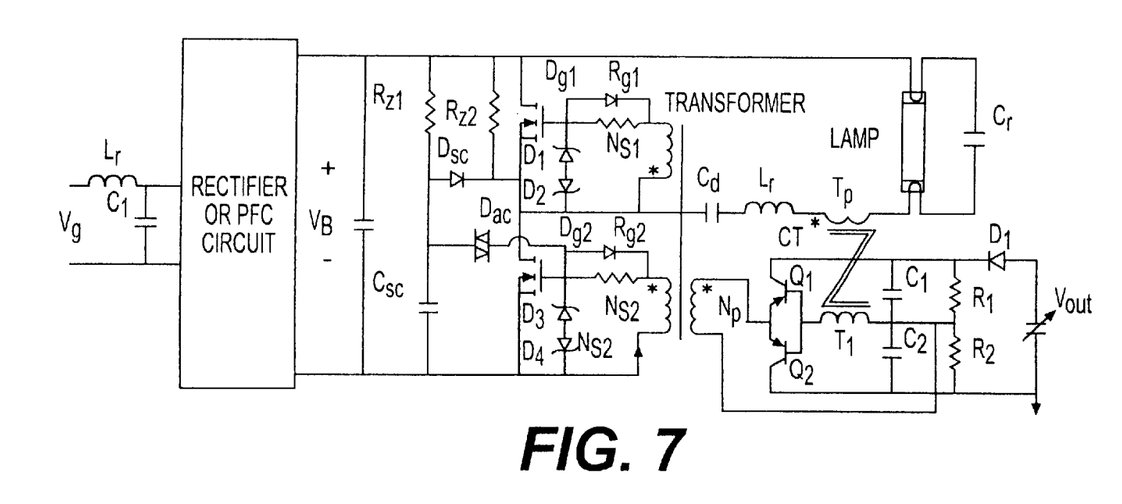
FIG. 7 is an exemplary preferred embodiment of the electronic ballast in accordance with the invention.

Thus it is proposed in accordance with the invention to control Iz by controlling the magnetizing current. Accordingly, a voltage-controlled voltage source is used in place of the zener diodes as the load of the current transformer CT as illustrated in FIG. 6A. Unlike the zener diode clamp, the voltage across the CT winding is controlled by an external voltage source Vctrl, where a pulse transformer is used to give the isolation for two gate drive voltages. FIG. 6B shows one implementation of the voltage-controlled voltage source including a capacitive voltage divider. FIG. 7 illustrates an exemplary detailed embodiment of the invention. In practice, two gate drive sources with isolation are needed for a totem-pole configuration as shown in the exemplary implementation of FIG. 7.

Unlike the traditional self-oscillating circuit, the gate drive circuit and the current transformer are separated. Two small signal transistors Q1 and Q2 are used to amplify the gate drive current and provide a current path to charge the clamp capacitors C1 and C2 through the base-collector junction diodes. The current transformer winding voltage equals the clamp capacitor voltage plus plus the base-collector voltage drop. The clamp capacitor voltage is easily controlled by an external voltage source Vctrl and two discharging resistors R1 and R2. The switching frequency thus is controllable in accordance with the magnitude of the control voltage. Considering MOSFET gate voltage rating of 5 to 15 volts, a suitable control voltage source would be from 10 to 30 volts in the configuration of FIG. 7 and is sufficient to provide a wide frequency switching range. Thus smooth and continuous dimming or other control of power to a generalized load can be obtained by variation of voltage over a similar range. It should be appreciated that the provision for current injection is thus made self-contained within the loop illustrated in FIG. 4 and the source of the external control voltage can also be derived in a simple and self-contained fashion from the DC link voltage or other DC voltage in the circuit or derived from an AC source, if available.

An additional benefit of the arrangement of FIG. 7 is that it can provide a good starting scenario to ensure long lamp life. A good starting scenario will usually include pre-heat (for heating lamp filaments to a proper temperature before the gas-discharge is ignited to lower ignition voltage and reduce cathode sputtering and lamp blackening) and start-up (applying sufficient voltage to ignite the lamp discharge) modes of operation which are difficult to accomplish with traditional self-oscillating electronic ballast. In accordance with the invention, a pre-heat mode can be achieved easily by setting the initial control voltage high enough to have a desired preheat switching frequency. About one second of operation at such a frequency is generally sufficient for pre-heating; which timing can be achieved with a simple RC circuit. The frequency is then reduced to provide a high lamp voltage in order to ignite the lamp.

Figure 8:
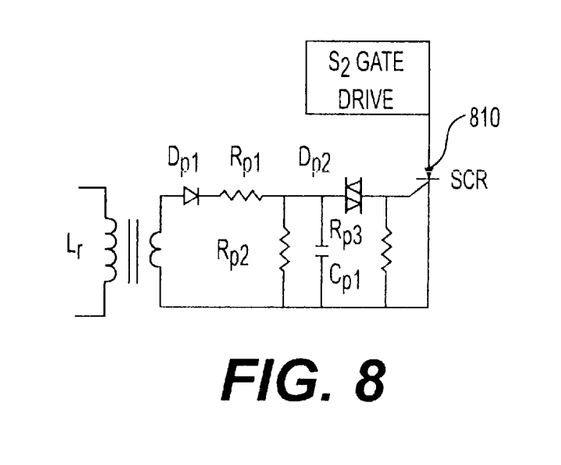
FIG. 8 is an exemplary over-voltage protection circuit suitable for the invention.

As a perfecting feature of the invention, a protection circuit is desirable in the event of lamp failure or other abnormal operation. FIG. 8 shows a suitable protection circuit which senses resonant inductor current to prevent the ballast from overcurrent damage. Once the SCR is turned on upon occurrence of an overcurrent condition, the converter cannot be re-triggered.

Figure 9A:
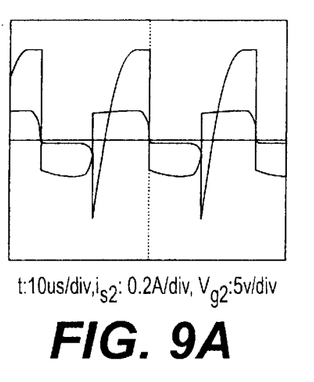
FIGS. 9A, 9B and 9C are graphs of measured switch current and gate drive voltages at different power levels.
Figure 9B:
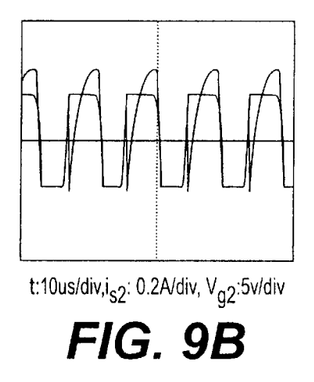
Figure 9C:
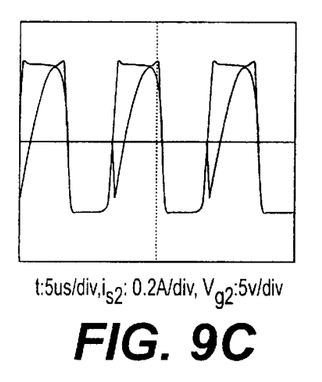
Figure 10A:
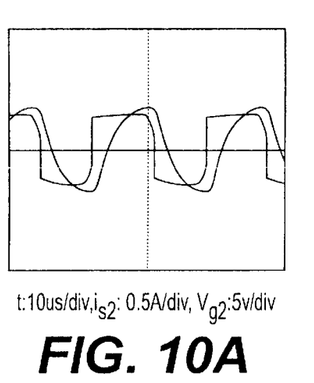
FIGS. 10A, 10B and 10C are graphs of measured lamp current and gate drive voltages and corresponding power levels.
Figure 10B:
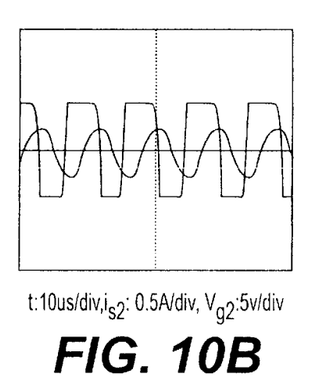
Figure 10C:
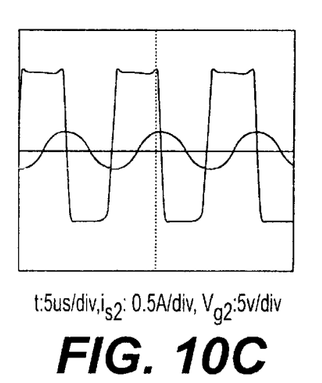

FIGS. 9 and 10 show experimental results of a prototype electronic ballast in accordance with the circuit of FIG. 7 under the conditions of DC link voltage of 300 volts, Lr=1.56 mH, Cr=5.6 nF and using a commercially available TDK PC40 core with a single turn primary winding and seventy-five turn secondary windings and rated lamp power of forty-five watts. Q1 and Q2 were standard 2N2222A and 2N2907A transistors, respectively.

FIGS. 9 and 10 show measured waveforms of switching current, gate voltage and lamp current at full load, 70% load and 60% load. (Lamp power is usually used as an approximation of dimming of luminous output at a given environmental temperature which is difficult and time consuming to measure.) The corresponding switching frequencies are 25.6 kHz, 44.3 kHz and 59.2 KHz for respective control voltages of 11 V, 17.4 V and 27.5 V. The relationship between lamp power and frequency is non-linear and lamp power drops abruptly as frequency increases beyond some value. However, the dimming range provided by the invention is substantial and sensitivity and resolution of control of the voltage source can be adjusted at voltages corresponding to that frequency value in numerous ways that will be apparent to those skilled in the art in view of the present description of the invention.

In view of the foregoing, it is seen that the invention provides a simple circuit for an electronic ballast which provides a substantial and easily controlled dimming of a gas-discharge lamp. Pre-heat and start-up modes of operation as well as overcurrent protection are easily provided with simple circuits which can be added, at will, to any of many embodiments employing the basic principles of the invention which are generalized and readily applicable to other types of power supplies and converters in many other environments and application.

While the invention has been described in terms of a single preferred embodiment, those skilled in the art will recognize that the invention can be practiced with modification within the spirit and scope of the appended claims.

Having thus described our invention, what we claim as new and desire to secure by Letters Patent is as follows:

1. A power supply comprising
   an inverter circuit,
   a resonant matching circuit, and
   a converter circuit for determining switching frequency of said inverter circuit substantially independent of a load, whereby power coupled to the load through said resonant matching circuit is controlled, comprising a gate control circuit including a controlled voltage source to determine said switching frequency of said inverter circuit, wherein said controlled voltage source includes a capacitive voltage divider.

2. The power supply as recited in claim 1, further including
   an arrangement for controlling said gate control circuit to regulate determination of switching frequency and power coupled to said load through said resonant matching circuit.

3. The power supply as recited in claim 2, further including
   means for establishing a high switching frequency of said inverter circuit for an initial period of time.

4. The power supply as recited in claim 1, wherein said control circuit controls magnetizing current in a transformer to control said switching frequency.

5. The power supply as recited in claim 1, wherein said voltage source controls magnetizing current in a transformer to control said switching frequency.

6. The power supply as recited in claim 1, further including an overcurrent protection circuit.

7. The power supply as recited in claim 1, wherein a resonant inductor current in said resonant matching circuit is fed through a transformer and converted into the voltage to drive said inverter circuit.

8. A discharge lamp ballast comprising
   an inverter circuit,
   a resonant matching circuit, and
   a converter circuit for determining switching frequency of said inverter circuit substantially independent of a load, whereby power coupled to the load through said resonant matching circuit is controlled, comprising a gate control circuit including a controlled voltage source to determine said switching frequency of said inverter circuit, wherein said controlled voltage source includes a capacitive voltage divider.

9. The discharge lamp ballast as recited in claim 8, further including
   an arrangement for controlling said gate control circuit to regulate determination of switching frequency and power coupled to said load through said resonant matching circuit.

10. The discharge lamp ballast as recited in claim 9, further including means for establishing a high switching frequency of said inverter circuit for an initial period of time.

11. The discharge lamp ballast as recited in claim 8, wherein said control circuit controls magnetizing current in a transformer to control said switching frequency.

12. The discharge lamp ballast as recited in claim 8, wherein said voltage source controls magnetizing current in a transformer to control said switching frequency.

13. The discharge lamp ballast as recited in claim 8, further including an overcurrent protection circuit.

14. The discharge lamp ballast as recited in claim 8, wherein a resonant inductor current in said resonant matching circuit is fed through a transformer and converted into the voltage to drive said inverter circuit.

15. A method of controlling high frequency electrical power delivered to a load from a self-oscillating power supply, said method including steps of controlling magnetizing current in a transformer of an inverter circuit to control switching frequency of said inverter circuit, coupling an output of said inverter circuit to the load through a resonant matching circuit, and feeding back a resonant inductor current in said resonant matching circuit through said transformer and converting said resonant inductor current into a voltage to drive said inverter circuit.

16. The method as recited in claim 15, wherein said load is a gas discharge lamp and said controlling step controls luminous output of said gas discharge lamp.

17. The method as recited in claim 16, wherein said controlling step includes the further step of controlling the voltage applied to said inverter circuit.

* * * * *